United States Patent [19]

Goto

[11] Patent Number: 4,795,224

[45] Date of Patent: Jan. 3, 1989

[54] OPTICAL SCANNING PATTERN GENERATOR

[76] Inventor: Katsuchlika Goto, 1-8-18 Koazawa, Satagaya-Ku, Tokyo 158, Japan

[21] Appl. No.: 915,400

[22] Filed: Oct. 6, 1986

[51] Int. Cl.$^4$ .......................... G02B 26/10; G06K 7/10
[52] U.S. Cl. ...................................... 350/6.3; 350/6.9; 250/236; 250/568; 235/467
[58] Field of Search .............................. 350/6.1-6.91; 250/236, 568, 235; 235/467; 358/205, 206, 208

[56] References Cited

U.S. PATENT DOCUMENTS

| | | | |
|---|---|---|---|
| 3,591,249 | 7/1971 | Wildhaber | 250/236 |
| 3,632,871 | 1/1972 | Watkins et al. | 350/6.9 |
| 3,765,743 | 10/1973 | Reaves et al. | 358/205 |
| 3,889,102 | 6/1975 | Dahlquist | 235/467 |
| 3,978,317 | 8/1976 | Yamaguchi et al. | 235/467 |

*Primary Examiner*—Jon W. Henry
*Attorney, Agent, or Firm*—Michael J. Hughes

[57] ABSTRACT

An optical scanning pattern generator device (10) is provided to include a laser beam generator (14) for generating a beam (16) which is caused to trace a scan pattern (76) within a scan zone (24) by a scattering system (20). The unique scattering system (20) includes a rotating mirror (44) for directing the beam (16) radially outward in a circle within a rotation plane (42). A rotating prism ring (50), rotating at a different rate than the rotating mirror (44) refracts the beam from the rotation plane (42), the amount of refraction being dependent on the particular prism element (52) within the ring (50) which is intersected by the beam (16). The refracted beam then is reflected toward the scan zone (24) by one of a series of fixed mirrors (58) which are circumferentially arranged about the prism ring (50). The beam (16) may be reflected off of a scan object (26) and collected in collection apparatus (28). The primary industrial applicability of the invention is in an economical bar code reader device particularly adapted for retail usage.

27 Claims, 3 Drawing Sheets

OPTICAL SCANNING PATTERN GENERATOR

TECHNICAL FIELD

The present invention relates generally to optical devices and more specifically to optical scanning pattern generation devices. The primary expected use of the preferred embodiment of the present invention is in bar code reading devices such as used in retail stores.

BACKGROUND ART

Numerous commercial uses have been developed in recent years for devices capable of creating an optical scanning pattern and associated devices for collecting and interpreting reflected or transmitted light beams with respect to various objects. Devices of this nature include symbol recognition systems, position sensors and image reproduction equipment.

One of the most common commercial applications of symbol recognition systems is in the retail market, particularly grocery stores, in which universal product codes ("UPC") and other commonly used bar codes are utilized to designate specific products and brands. These bar codes are directly placed upon the products or the packaging thereof and are adapted to be scanned and analyzed by commercially available apparatus. Large grocery chains have made particular use of systems of this type.

Bar code reading systems fall into to two major categories, with one being a type of system in which the scanner is moved past the code while the other utilizes a movement of the scanned object through a scanning pattern created by a stationary system. Both types of systems have advantages and disadvantages but the stationary system is best adapted for large scale operations such as supermarkets and large grocery stores.

Numerous United States Patents have been issued regarding bar code reading systems of both types. Examples of hand held or portable scanning devices are found in U.S. Pat. No. 4,251,798, issued to J. Swartz, et al., U.S. Pat. No. 4,578,571, issued to R. E. Williams and U.S. Pat. No. 4,570,057, issued to G. E. Chadima, Jr., et al. These represent hand held devices which are held in a specific orientation and then moved past the bar code on the object. The devices are utilized to transmit information regarding the bar code to processing apparatus. With this sort of device the scanning pattern generated by the scanning device need not be complex and may in fact be a single beam in a constant position, since the device may be moved, thus creating its own scanning pattern by device movement, is held in close proximity to the bar code and need not scan a wide field.

In the case of stationary scanning systems, this is not the case. It is desirable to allow a fair amount of operator flexibility in placement of the bar code with respect to the scanning device. The desirability of a fairly broad and deep scanning zone for effective reading of the bar code makes it necessary for the system to include a device which generates a scanning pattern with a substantial effective spatial zone. Consequently, stationary scanning systems tend to be highly complex as compared to portable systems. Examples of United States Patents which have been issued on stationary bar code scanning systems are U.S. Pat. No. 4,057,784, issued to B. R. Tafoya, U.S. Pat. No. 4,093,895, issued to F. G. Nickl and U.S. Pat. No. 4,282,431, issued to J. D. Anthony, Jr., et al.

A necessary element of the stationary bar code scanning systems is an effective scanning pattern generator. These generators must include a method for taking a beam of coherent light, typically generated by a laser, and scattering it into a specific scan pattern. This is ordinarily accomplished, as shown in the stationary systems patents referred to above, by rotating multifaceted mirrors or oscillating mirrors. The beam of light will be sequentially reflected off the moving facets and thus be directed into different pathways, depending on the angles of reflection. If the rotation or oscillation is undertaken at high speed an effective pattern may be created. An example of a U.S. Patent relating to a scanning apparatus utilizing this type of technology in a somewhat simplified manner is to be found in U.S. Pat. No. 4,450,350, issued to J. A. Hardy. Another pure pattern generator is disclosed in U.S. Pat. No. 4,041,322, issued to T. D. Hayosh, et al.

A common disadvantage of the prior art scanning pattern generators is that systems based on multifaceted rotating mirrors are difficult and expensive to manufacture and result in complex and bulky systems. Typically, a stationary system such as utilized in a grocery store is a large under the counter installation weighing in excess of twenty kilograms and occupying a substantial volume. These sorts of devices also represent substantial capital investment which is beyond the means of many smaller operations.

Consequently, there has been a substantial need in the marketplace for a low cost compact combination optical scanning pattern generator and associated detector apparatus which is more appropriate for a small operation. It is particularly desirable that this be a fixed system since this is the manner in which most clerks handle items. It is much more efficient to keep the item moving in front of the fixed scanner that to move the scanner over the item in such applications as grocery stores where the bar codes are utilized. The need has also existed for an overhead mounted scanner since this will be easier for the clerk to utilize since the clerk will be able to optically observe the scan and the positioning of the bar codes during the scan process.

DISCLOSURE OF INVENTION

Accordingly, it is an object of the present invention to provide an optical scanning pattern generation device having a broad scanning zone.

It is another object of the present invention to provide an optical scanning pattern generator which minimizes effective blind spots.

It is a further object of the present invention to provide an optical scanning pattern generator which may be operated at relatively low rotational frequency for the central scattering mirror.

It is yet another object of the present invention to provide an optical scanning pattern generator which may be readily and economically manufactured.

It is a still further object of the present invention to provide an optical scanning pattern generator device which may be contained in a compact housing and is independent of orientation.

Briefly, the preferred embodiment of the present invention is an optical scanning pattern generator device which is particularly adapted for use in scanning partially reflective items such as bar codes and symbols. It is especially adapted for use in applications such as grocery and retail stores wherein the objects are sensed by optical reading of bar codes and information regarding price, quantity and inventory are derived from the code by central processing units. The preferred embodiment of the present invention is adapted to be very small and easily mounted so that it may be utilized in any orientation, although the preferred orientation is with the device as an overhead code reader with the beam being directed downward, rather than upward from a counter mounted device, as is the prior art.

The preferred embodiment of the device includes a compact housing including a gas laser capable of generating a coherent beam of light. Various components within the structure are utilized to direct the coherent beam of light to a scattering system which causes the beam of light to be scattered throughout a predictable scanning pattern which is focused at a scanning zone some distance from the device. The specific pattern of the scanning beam traverse is determined by the structure of the scattering system. In the preferred embodiment, the scattering system includes a central rotating mirror which directs the light beam through one of eight prisms which are arrayed in a rotating ring about the central rotating mirror and onto a series of nine identical circumferentially adjacent stationary mirrors. Each of the nine stationary mirrors causes the beam to be deflected through the scanning zone at a different orientation, depending on the angle of the mirror with respect to a reference plane. The eight individual prisms within the prism ring are adapted to refractively deflect the scanning beam so that it will strike each of the stationary mirrors at a differing angle of incidence, depending on which prism is within the beam path.

A factor of particular importance to performance is the ratio of rotational speeds of the rotating central mirror and the prism ring. In an ideal system where the two elements are slaved together, such as with a gear structure, the preferred ratio would be seven rotations of the prism ring for each eight rotations of the mirror. The rotations are in the same direction. If this is accomplished and the original positions are coordinated, then a change of the beam from one prism to the next will occur at the interface between adjacent fixed mirrors such that only very small short duration blind spots are created in the scan zone. In the actual preferred embodiment, however, due to the economics of using lower precision motors, a ratio of about 9 to 10 is utilized. This creates an ever-changing blind spot which has no significant effect at the actual operating speeds and is attainable without precise tolerances and correlations.

The rotation of the central rotating mirror and the prism ring is maintained in the preferred embodiment by a pair of constant speed brushless DC motors with the prism ring motor shaft being concentrically exterior to the central rotating mirror shaft. The motors used are the bell rotor type and the mirror is attached to the shaft of one while the prism ring is directly mounted to the bell frame of the other. The scanning beam is directed into the scattering system from a point within the focal blind cone of the system so that the directing component does not interfere with the scattered beam. The resulting scanning pattern includes seventy-two linear segments, arrayed in nine angularly offset groups of eight essentially parallel segments.

An advantage of the present invention is that the use of the rotating prism ring permits a more complete and effective scanning pattern with a lower rotation rate of the central scattering mirror than is possible in prior art devices.

Another advantage of the present invention is that the prism ring elements may be constructed of low cost materials such as plexiglass, thus reducing the number of moving mirrors, accordingly reducing the overall cost of the device.

A further advantage of the present invention is that the device is lighter and more compact than prior art scanning pattern generators so that it may be mounted in an overhead orientation, rather than the larger in-counter installations presently utilized.

Another advantage of the present invention is that the overhead mounting feature substantially reduces the likelihood of laser beams being directed into the user's eyes.

Yet another advantage of overhead mounting made possible by the lightness and compactness of the present invention is that installation and electrical connections are drastically simplified.

A still further advantage of the overhead mounting capability of the present invention is that it may safely permit the use of more powerful scanning lasers.

A still further advantage of the present invention is that it utilizes compact, convential brushless DC motors to operate the scattering system.

These and other objects and advantages of the present invention will become clear to those skilled in the art in view of the best presently known mode of carrying out the invention and the industrial applicability of the preferred embodiment as described herein and as illustrated in the several figures of the drawing.

BEST MODE OF CARRYING OUT INVENTION

The present invention is an optical scanning pattern generator device particularly adapted for utilizing a coherent light beam to generate a scan pattern within a desired scan zone. It is especially adapted for use in scanning systems such as those utilized to read bar codes in the retail and grocery industry and for symbol recognition systems.

Figure 1:
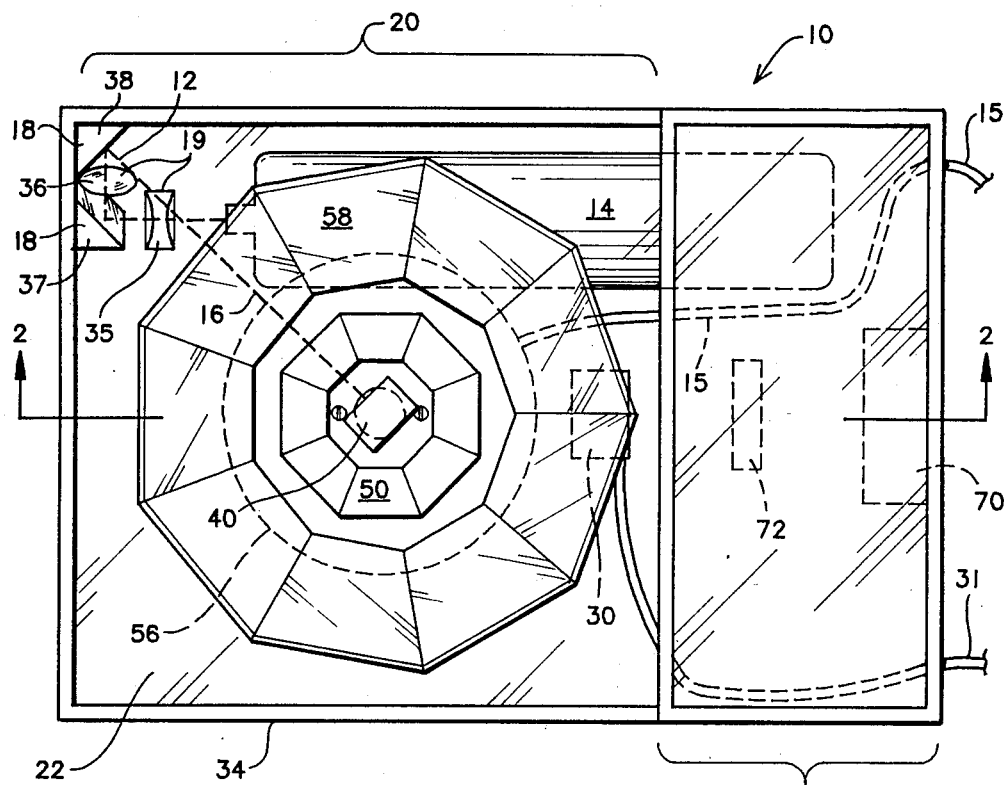
FIG. 1 is a top plan view of the optical scanning pattern generator device of the present invention.
Figure 2:
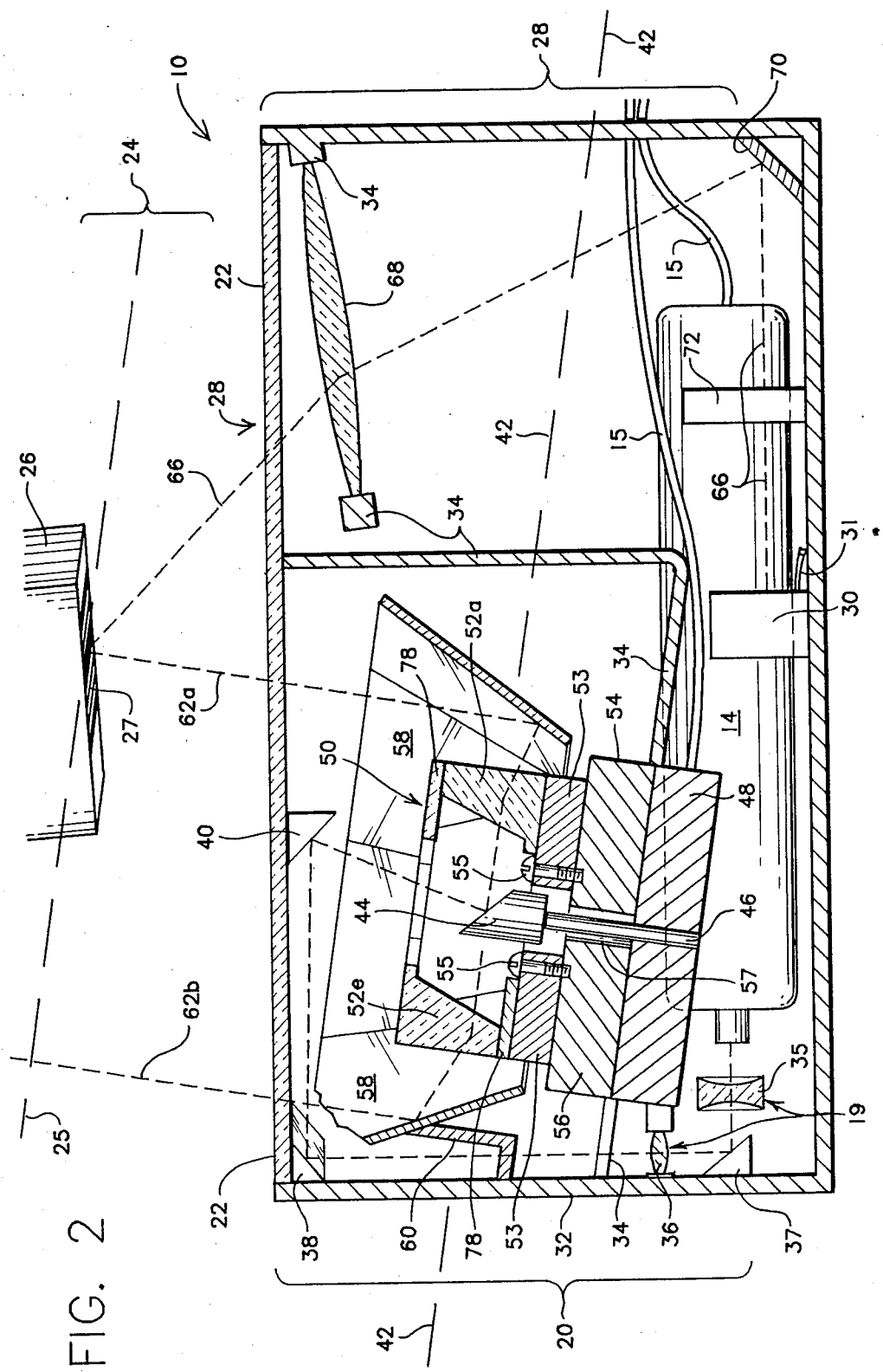
FIG. 2 is a cross sectional view, taken along line 2—2 of FIG. 1.
Figure 4:
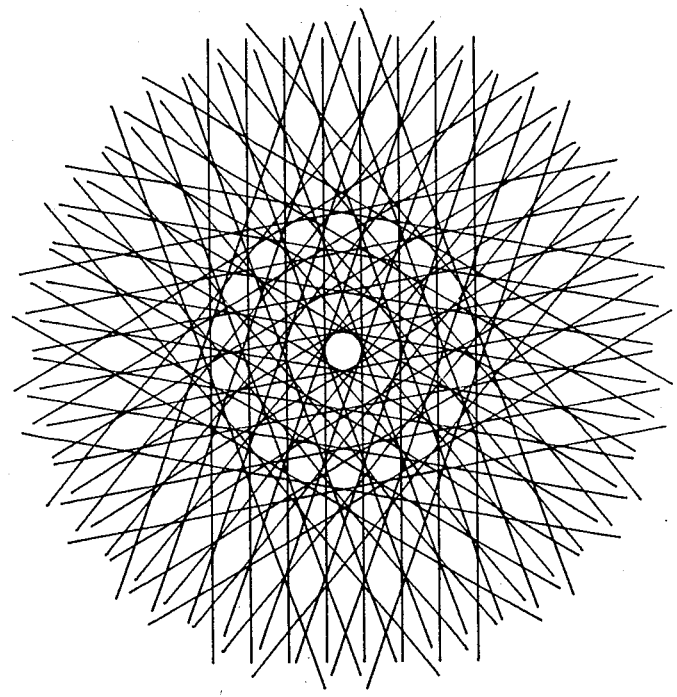
FIG. 4 is a schematic diagram of the optical scanning pattern generated by the preferred embodiment at the optimal focus plane.

Referring now to FIG. 1 and FIG. 2, the optical scanning pattern generator of the preferred embodiment is illustrated in a top plan view in FIG. 1 and a cross sectional view, taken along line 2—2 of FIG. 1, in FIG. 2. The optical scanning pattern generator device is referred to by the general reference character 10. Although the typical usage orientation of the device 10 will have the scan zone beneath the device, FIGS. 1 and 2 show an inverted orientation for ease of description. The actual orientation of the device 10 is immaterial to its operation.

The components of the device 10 are best understood by reference to both FIG. 1 and FIG. 2 in conjunction with the following detailed description.

The primary purpose of the pattern generator 10 is to take a single coherent beam of electromagnetic energy, usually in the frequency range of visible light, travelling along a beam path 12 and scatter it into a desired pattern. The invention is best understood in consideration of the effect of the invention on the beam path 12.

Initially, a beam generator 14, typically a low power helium-neon (HeNe) gas laser connected to an external power source by a connector 15, generates a coherent light beam 16. For most scanning systems the light beam 16 will be in the frequency range of visible red and have a wavelength of approximately 632.8 nm. The light beam 16 travels along the beam path 12 and intersects various directional path altering components 18, such as mirrors, and beam character manipulation elements 19, such as lenses, which shape and deflect the light beam 16 along the desired beam path 12 without otherwise altering its characteristics. The number and type of directional path altering components 18 will be dependent on the specific structural requirements of the device. The purpose of the directional path altering components 18 is to deliver the light beam to a scattering system 20 which effectively takes the beam and redirects it sequentially into a predetermined scanning pattern. Whereas the directional path altering components 18 are fixed and act only to continually modify the direction of the beam path 12 in a constant direction, the scattering system 20 causes the light beam 16 to be sequentially deflected through a transparent window 22 into a scan zone 24 situated outside of the generator device 10.

In FIG. 2, it may be seen that an optimal focus plane 25 exists within the scan zone 24 at a desired distance from the transparent window 22. In use, a scan object 26, including a bar code 27, or similar symbol element, is passed through the scan zone and the light beam 16 is reflected off the bar code 27 and reflected to a reflected beam collection apparatus 28, including one or more detectors 30. The beam collection apparatus 28 and the detectors 30 are conventional elements, discussed in greater detail below, which are utilized to collect and analyze the reflected beam from the bar code 27 and deliver the information via electrical connecting elements 31 to a central processing apparatus (not shown) which interprets the information. The processing apparatus then determines such information as identification, price, inventory, data and the like and delivers it to the appropriate devices, such as the cash register or inventory computer.

The entire scanning pattern generator 10 and the associated detection apparatus 28 are enclosed within a housing 32. The various internal elements of the generator 10 and the dection apparatus 28 are held in position by an internal support structure 34. The internal support structure 34 is a matter of constructional engineering and is only partially illustrated in the drawing.

Although the electromagnetic beam 16 emitted from the laser 14 is ideally coherent and nonexpanding, i.e. it will remain in a tight cylinder throughout the beam path 12, this is not actually the case. According, it is has been determined that it is desirable to shape the beam 16 at some point along the path 12 to increase its cohesiveness. The elements of the beam shaping components 19 serve this purpose.

Prior users have determined that laser beam cohesiveness is improved by first passing the beam 16 through a concave lens 35 which expands it and then through a convex lens 36 which refocuses into a tighter "cylinder".

In the preferred embodiment 10 the beam shaping components 19 further serve the purpose of narrowing the beam 16 to an appropriate diameter for the purposes of scanning bar codes 27. A typical helium-neon laser 14 will generate a beam 16 having a diameter of approximately 0.49 mm while the narrowest bar in a UPC bar code has a width of 0.19 mm. Clearly, precise reading is inhibited by a beam more than double the width of the bar. Accordingly, it is desirable to narrow the beam 16 so that is approximately the same diameter as the width of the bars of the bar code 27 within the scan zone 24. The focal length of the convex lens 36 is therefore selected such that a minimum cylinder of less than 0.2 mm diameter is achieved at the optimal focus plane 25, with a cylinder diameter of not greater than 0.2 mm existing within the entire scan zone 24, with the scan zone 24 having a depth of about 5 cm (2 in) on each side of the optimal focus plane 25.

The actual positioning of the concave lens 35 and the convex lens 36 along the beam path 12 is a matter of choice and a factor of the particular focal lengths of the lenses selected. The positions shown in FIGS. 1 and 2 are somewhat arbitrary but are selected for maximum adjustability.

In the specific structure of the preferred embodiment 10, the directional path altering components 18 include a first deflector 37 situated in the lower portion of the housing 32 directly in the beam outlet path of the laser 14. The first deflector 37 directs the beam 16 from the output of the laser 14 upward at an angle to a corner at the top of the housing 32 where a second deflector 38 is situated. The angle of the second deflector 38 is such that it directs the beam 16, above the components of the scattering system 20, diagonally inward to a central deflector 40. The central deflector 40 then deflects the beam angularly downward (assuming the orientation of FIGS. 1 and 2) to the scattering system 20.

Figure 3:
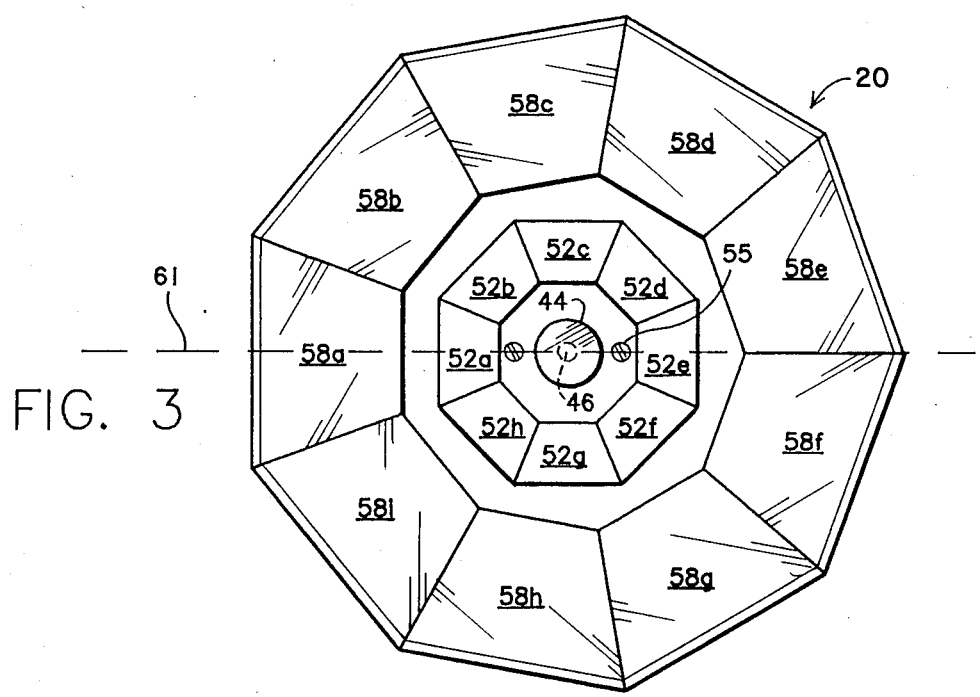
FIG. 3 is a top plan view of the optical components of the scattering system of the preferred embodiment.

The scattering system 20 is best understood by reference to both FIG. 2 and to FIG. 3. FIG. 3 is a top plan view, as seen from the orientation of the optimal focus plane 25, of the scattering system 20 components only. The entire scattering system 20 is oriented at a slant from the orientation of the housing 32 by an angle of approximately 12°. This slant is represented in FIG. 2 by a base reference plane 42. The base reference plane 42 and the optimal focus plane 25 are parallel. The slanting is desireable to direct the beam 16 toward the collection apparatus 28 upon reflection from the scan object 26.

The scattering system 20 includes a rotating mirror 44 which is adapted to deflect the beam 16 from its perpendicular path to a continual rotating radial path within a plane congruent or parallel to the base reference plane 42. The rotating mirror 44 is, in the preferred embodiment 10, a cylindrical element sliced at an angle with the upper surface being reflective. The rotating mirror 44 is mounted on a mirror shaft 46 which is connected to a first motor 48. The first motor 48, in the preferred embodiment, is a constant rotational speed brushless DC motor of conventional design.

Once the electromagnetic beam 16 has been deflected by the rotating mirror 44 it will be parallel to the base reference plane 42. It will then intersect a rotating prism ring 50 which includes a plurality of prism elements 52. In the preferred embodiment the prism ring 50 includes eight distinct prism elements 52a through 52h. Each of the prism elements 52a through 52h is adapted to refract the electromagnetic beam 16 at a different angle from the base reference plane 42, depending on its particular structure. Each of the prism elements 52 results in a different refraction such that a range of prism exiting angles is achieved. The exit angles for the prisms 52a through 52h with respect to the base plane 42 are set forth below in Table A.

TABLE A

| Prism | Angle of Refraction |
| --- | --- |
| 52a | +3° |
| 52b | −9° |
| 52c | +21° |
| 52d | −12° |
| 52e | +12° |
| 52f | −21° |
| 52g | +9° |
| 52h | −3° |

Figure 5:
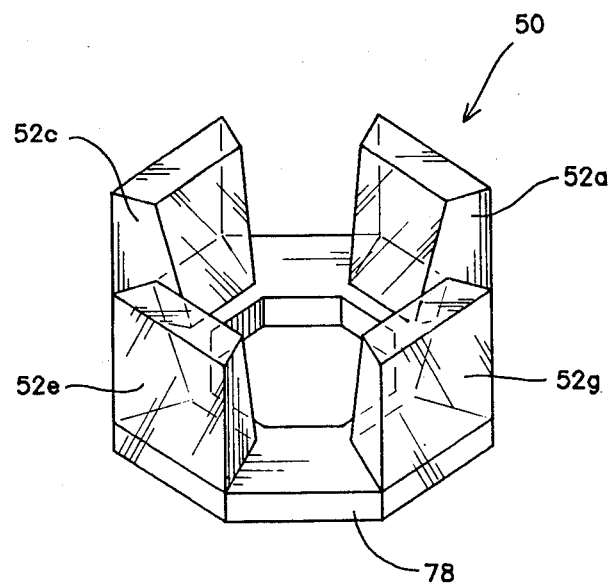
FIG. 5 is a perspective view of one of the two components forming the prism ring.

The eight individual prisms are integrally formed into the prism ring, see discussion associated with FIG. 5, and are arrayed in the order set forth above. The order stated is arbitrary and need not be the actual arrangement of the individual prisms. Furthermore, the specific angles of refraction may be modified. The only difference which will occur will be to either narrow or broaden the scan pattern depending on modifications of angles of refraction and to alter the sequence of the scan pattern in the case of changing the order of prisms. This modification of sequence has no effective significance at the speeds of operation utilized in the device 10.

The rotation of the prism ring 50 is accomplished by affixing the prism ring 50 to a spacer ring 53 which is attached to the bell portion 54 of a second motor 56 by way of a pair of securing screws 55. The second motor 56 is similar to the first motor 48 in that it is a constant speed DC motor having a central interior stator and a bell type rotor rotating about the stator in an exterior fashion. In the case of the second motor 56 the rotor 54 is provided with a hollow rotor shaft 57 which serves only to position the bell or rotor portion 54 with respect to the stationary stator, which is mounted to a portion of the internal support structure 34 in a manner similar to the mounting of the first motor 48. The hollow rotor shaft 57 is provided in order to allow unhindered passage of the mirror shaft 46 from the first motor 48. Since the prism ring 50 is hollow in the center, there is no interference with the rotation of the mirror by the prism ring 50 or the second motor 56.

The prism ring 50 rotates directly with the rotor portion 54 of the second motor 56 since it is directly mounted thereon by a pair of mounting screws 59. This concentric shaft and direct mounting arrangement with the two motors sharing a single portion of the support structure 34 is extremely compact and convenient for the device 10.

It is necessary that the rotations of the first motor 48, and hence the rotating mirror 44, and the second motor 56 and hence the prism ring 50, be independent. This is because for proper operation it is essential that the rotating mirror 44 and the prism ring 50 rotate at different speeds. A difference in rotational rates is necessary to achieve the scattering of the pattern. In the preferred embodiment the ratio of rotational speeds of the first motor 48 to the second motor 56 is nine to ten (9 to 10). It has been found that a ten percent offset in rotational speed is desirable to minimize repeatable blind spots in the resulting scan pattern.

After the electromagnetic beam 16 has been refracted by the associated prism element (52e as shown in FIG. 1), it will encounter one of a series of fixed mirrors 58 arranged in a circumferential ring about the prism ring 50. As is best seen in the illustration of FIG. 3, there are nine identical fixed mirrors 58a through 58i in the preferred embodiment. Each of the fixed mirrors 58a through 58i is trapezoidal in shape and is supported within the frame 32 by mirror buttresses 60. The angle of inclination of the fixed mirrors 58 with respect to the base reference plane 42 of the electromagnetic beam 16 as it is reflected from the rotating mirror 44 is identical for each of the mirrors, and is in the range of 40° to 45° from the base reference plane 42. The angle of placement for each of the fixed mirrors 58a to 58i, with respect to a normal reference plane 61, (see FIG. 3) normal to the base reference plane 42 and arbitrarily selected to bisect fixed mirror 58a, are set forth below in Table B.

TABLE B

| Fixed Mirror | Angle of Intersection |
| --- | --- |
| 58a | 0° |
| 58b | 40° |
| 58c | 80° |
| 58d | 120° |
| 58e | 160° |
| 58f | 200° |
| 58g | 240° |
| 58h | 280° |
| 58i | 320° |

The path of the electromagnetic beam 16 as it is reflected from the particular fixed mirror 58 to which it is directed is known as an exit beam path 62. The direction of the exit beam path 62 is dependent upon the angle of inclination of the mirror 58, the angle of the mirror with respect to the normal reference plane, and the angle of incidence of the electromagnetic beam 16, a factor of the particular prism element 52 through which the beam 16 has passed. Since there are eight different angles of refraction available from the eight different prism elements 52, a total of eight different exit beam paths 62 are available for each of the fixed mirrors 58. As the rotating mirror 44 rotates, the beam 16 will pass across a given fixed mirror 58 laterally in the direction of rotation. Thus, in a given rotation of the rotating mirror 44, the beam 16 will have a scan path in the nature of a straight line segment 64. The linear scan segments 64 associated with each of the fixed mirrors 58 for each of the eight prism elements 52 will be parallel to each other. The separation between the scan segments 64 is a factor of the angles of refraction of the prism elements 52, the angle of inclination of the fixed mirrors 58 and the distance from the device 10.

Two examples of resulting exit beam paths 62 are illustrated in FIG. 2. An exit beam path 62a is illustrated for the shown orientation of the rotating mirror 44 and the prism ring 50. For exit beam path 62a, the electromagnetic beam 16 passes through prism element 52e and is deflected +12° from the base reference plane. It then intersects fixed mirror 58d, having an angle of inclination of 42.5°. The net result is that the reflection of the beam 16 results in an exit beam path 62a having an angle of inclination to the base reference plane 42 of 73°. In the example shown in FIG. 1, this exit beam path 62b would intersect the bar code 27 on the scan object 26 and be reflected therefrom, depending upon the angle of inclination of the bar code 27. In this example, it is shown as being reflected from the bar code 27 to the reflected beam collection apparatus 28.

Alternatively, if the rotating mirror 44 were positioned directly opposite the illustration of FIG. 1, an alternate exit beam path 62b would result, as shown by a broken dashed line. In this instance, the electromagnetic beam 16 would be refracted by an angle of +3° by the prism element 52a to intersect the fixed mirror 58a having an angle of inclination of 42.5° such that the exit beam path 62b is reflected from the fixed mirror 58a at an angle of 82° from the base reference plane 42. Although the illustrated exit beam paths 62a and 62b are shown as being line segments having no depth, it is understood that these angles will remain nearly constant for the entire sweep of the beam 16 across the width of the fixed mirror 58 for a given rotation of the rotating mirror 44. Thus, each of the exit beam paths 62 defines one of the generally linear scan segments 64. Those illustrated in FIG. 2 as exit beam paths 62a and 62b represent only two of the seventy-two possible scan segments 64 which are created by the combination of eight prism elements 52 and nine fixed mirrors 58 of the preferred embodiment 10.

Once the exit beam 62a has encountered the scan object 26 and more particularly the bar code 27, it will be reflected therefrom depending on its angle of incidence and the positioning of the bar code 27. This results in a reflected beam 66. A certain percentage of the reflected beams 66 will be directed toward the beam collection apparatus 28. The beam collection apparatus 28 analyzes the pattern of the reflected beams 66 and is able to recognize the identity of the bar code 27 therefrom.

Although the precise structure of the reflected beam collection apparatus 28 is not a necessary portion of the invention, the structure of one preferred embodiment of the beam collector 28 is discussed herein to illustrate a manner in which beam collection may be accomplished in a simple and compact manner. Unlike many prior art devices in which the reflected beam 66 is directed back through the scattering system mirrors to the same optical system, the beam collection apparatus 28 shown with the preferred embodiment 10, is spatially separated from the scattering system 20. This is a matter of choice and is not critical to the operation of the scattering system 20 but it simplifies construction and minimizes precise positioning requirements for optical elements.

In the beam collection apparatus 28 of the preferred embodiment 10, the reflected beam 66 passes through the transparent window 22 and encounters a focusing lens 68 which focuses the reflected beam to a reflector 70 which reflects the beam 66 through a color separation filter 72 and into the detector 30. The focusing lens 68 is selected to be a convex lens which concentrates the beam by combining it somewhat with slightly scattered reflections which may also encounter the focusing lens 68 at positions slightly different than the main reflected beam 66. The reflector 70 is selected to be a "diffusion-type" mirror which directs the focused beam toward the deflector 30. The filter 72 is provided to pass only electromagnetic energy of the desired wavelength through to the detector 30. This prevents ambient light and stray reflections from interfering with the sensing apparatus. The filter 72 passes only energy of the same wavelength as that generated by the laser 14.

The detector 30 is a conventional photoelectric detector specific to the appropriate frequency range and is connected by the signal carrying connector 31 to analyzing means 74 (not shown). The conventional analyzing means 74, such as that disclosed in prior scanning pattern generators, includes an analog/digital signal processor (convertor) which receives the raw signal created by the detector 30 and converts the signal into a digital form. The digital signal is then directed to a decoder, a central processing unit interface and the central processing unit or CPU itself. Specific programming is provided in the CPU to analyze the signals generated by the detector 30 and the analyzing means 74 to read the bar code 27 and make appropriate use of the data.

The scan segments 64, as viewed from the optimal focus plane 25, form a scan pattern 76, illustrated in a schematic form in FIG. 3. The orientation of each scan segment 64 is determined by the relative angle of the fixed mirror 58 with respect to the normal reference plane 61 (see FIG. 3). Since each of the fixed mirrors 58 is arrayed at a different angle with respect to the normal reference plane 61 and since the fixed mirrors 58 are arrayed in a circle, a complete cycle is obtained in the resulting scan pattern 76. Each of the fixed mirrors 58, considered in clockwise order from fixed mirror 58a, is angled with respect to the normal reference plane 61 by a factor of 360° divided by nine (40°) greater than the next adjacent fixed mirror 58. Therefore, for example, the angle of the scan segments 64 associated with fixed mirror 58c will be rotated by 40° from the scan segments 64 associated with fixed mirror 58b. In this manner, the complete scan pattern 76 covers an entire, roughly circular, zone within a given focus plane. Of course, in alternate embodiments, the specific spacing and relative angles of the scan segment 64 may be modified by altering the number and refraction angles of the prism elements and the number and inclination angles of the fixed mirrors 58.

Although the scan pattern 76 is illustrated as if it were simultaneously existing, it is understood that this is not actually the case. Each of the scan segments 64 is created sequentially by the passage of the electromagnetic beam 16 through the associated prism element 52 and across the associated fixed mirror 58 upon rotation of the rotating mirror 44. However, since the rotational speed of the rotating mirror 44 is selected to be relatively high, in the preferred embodiment approximately 2000–3000 rpm, the pattern may be considered to be simultaneously created for most purposes.

One of the features of the preferred embodiment 10 is the unique construction which is utilized to reduce costs of manufacture with respect to the prism ring 50. This unique construction is illustrated an exploded perspective manner in FIG. 5.

The prism ring 50 is constructed of two identical segments which are preassembled and then joined together in complimentary fashion to form a complete ring. One of these segments is shown in FIG. 5. Each of the segments includes a prism mounting plate 78 upon which are mounted four of the prism elements 52. The prism elements 52 are only mounted upon every other available mounting position of the mounting plate 78 while the remainder of the plate 78 is left clear. The prisms 52 mounted on a particular plate 78 are either all of the negative refractive prisms (as shown) or all of the positive refractive prisms. In this manner, two of the assembled portions may be affixed together in a complimentary fashion to form a complete prism ring 50 with no gaps. The prism elements 52a, 52c, 52e and 52g become elements 52b, 52d, 52f and 52g when inverted. This construction is very economical and simple to accomplish. The prism mounting plates 78 and the associated four prism elements 52 may be formed as a single plexiglass molding. Then the two complimentary plates are adhered together to form the resulting prism ring 50.

A vertical separation with non-light penetrating material of approximately 1 mm between the prisms is desirable to avoid splitting of the beam during the prism transition, thereby avoiding two simultaneous scanning lines.

The exterior surface of the bottom of the mounting plates 78 is adhered or otherwise rigidly attached to the top surface of the spacer ring 53. This, plus the attachment of the spacer ring 53 to the second motor 56 by way of the screws 55 causes the prism ring 50 to rotate as a unit with the second motor 50. The spacer ring 53 is provided with appropriate projections and apertures to facilitate the screw attachment.

Although only a single embodiment 10 of the optical scanning pattern generator device has been illustrated herein, it is understood that various alternate embodiments are available. For example, the laser 14 might be mounted to vertically direct its beam through the mirror shaft 46. In this instance, if the rotating mirror 44 is inverted, the same planar beam path 12, as it leaves the rotating mirror 44, will be achieved. In this instance the scanning pattern generator portion of the device would be elongated but narrowed, a construction which may be desirable for certain applications. Various other possible manners of directing the electromagnetic beam 16 into the scattering system 20 may also be utilized. For example, in a system in which it is desired to have the detection apparatus occupy the same space as the scanning pattern generator apparatus the tilting of various elements will not be necessary.

Numerous other changes may be made with only minor alterations in the resulting effectiveness of the device 10. For example, the number of prisms 52 within the prism ring 50 may be changed. Furthermore, the precise angles of refraction are not critical in altering refraction sequence and degree will only result in a moderately different scan pattern which may be equally effective. The number and inclination of fixed mirrors 58 may also be altered without destroying the effectiveness of the device. The numbers of prisms 52 and mirrors 58 selected are believed to be optimal for use with a rotating mirror 44 being rotated at a relatively slow speed (2000 to 4000 rpm). However, if a higher speed of rotation of the rotating mirror 44 is utilized higher read rate may be achieved, or the number of prisms and mirrors may be reduced while still producing an effective scan pattern 76.

The preferred embodiment utilizes constant speed DC motors for the first motor 48 and the second motor 56. This type of motor is compact, economical and easily electronically controlled. Although not shown, the control circuitry for these motors is very well known in the art and any of a wide variety of conventional types may be utilized. Also, the preferred embodiment 10 is shown as utilizing two distinct motors 48 and 56 to control the rotation of the rotating mirror 44 and the prism ring 50. It is understood that this may be accomplished by a single motor and a gearing system. This type of mechanical operation using a single motor would have advantages as discussed above, in that a precise correlation of the rotational speeds of the rotating mirror 44 and the prism ring 50 might be accomplished to specifically cause the beam 16 to switch from one prism element 52 to the next at the intersection between adjacent fixed mirrors 58, thus minimizing blind spots. Such a gearing system, utilizing a ratio of rotations of eight to seven would be appropriate providing the initial positioning of the elements was properly set. However, this sort of structure is not preferred because it is much more sensitive and difficult to manufacture than the dual motor structure of the preferred embodiment 10.

The preferred material for construction of the prism ring 50 is plexiglass (acrylic) since it is easily molded, has well known optical characteristics and is inexpensive. Plexiglass also stands up well to the stress of rapid rotation. However, other materials may be substituted without departing from the teaching of the invention. Standard conventional mirror and lens construction may be utilized for the remainder of the optical elements while the preferred laser element 14 is a Helium-Neon laser, although other light sources, including non-laser sources, may be easily utilized.

Although precise dimensions and relationships are not critical to the effectiveness of the optical scanning pattern generator 10, the compact size of the device is a major advantage. In one construction of the preferred embodiment 10 the housing 32 has a width of 17.6 cm (7 in), a depth of 12.6 cm, (5 in) and a height of 7.5 cm (3 in). A separate housing of comparable size of electrical circuits, decoder, power supply and other supporting and processing parts is installed below the counter (or any place of convenience), or may be incorporated into the cash register. The entire device has a weight of less than 3 kg (6 lb).

The preferred prism ring 50 has an outside diameter of 0.5 cm (0.20 in), and inside diameter of 0.3 cm (0.08 in) and a height of 1.4 cm (0.56 in) while the spacer ring has a thickness of 1.0 cm (0.4 in). Each fixed mirror is a trapezoid having a maximum width of 3.8 cm (1.5 in), a minimum width of 1.9 cm (0.75 in) and a height of 3.8 cm (1.5 in). The other elements are scaled accordingly.

All of the above are only some examples of the available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The optical scanning pattern generator system of the present invention is expected to have extremely widespread and immediate industrial applicability. The system is particularly well adapted for utilization in grocery and other retail stores wherein the UPC and other commonly used bar coding systems are utilized. It is especially adapted for easy retrofitting to checkout counter designs in retail operations in that it is not necessary to occupy a great deal of space or mount within the existing counters.

The compact size of the scanning pattern generator device 10 permits it to be mounted in an overhead application. Since the precise orientation of the system 10 with respect to gravity is irrelevant it may be mounted such that the exit beam pass 62 is directed downward toward the countertop instead of upward toward the user's eyes as in many prior art systems. This sort of overhead mounting provides for many advantages and should substantially increase the acceptance in the marketplace of the present invention. Installation is made simple and inexpensive, critical space utilization is minimized and the operator is able to see the bar code while passing it through the scanning beam. The scanning laser is not directed into the operator's eyes as in counter mounted systems. Many other advantages accompany the usage of the present invention with respect to prior systems.

For all of the above stated reasons and several which are not discussed herein, it is believed that the present invention will be immediately and widely accepted in the retail industry. It is therefore expected that the invention will have broad industrial applicability and commercial utility.

I claim:

1. An optical pattern generation device comprising:
   optical beam creation means to create an electromagnetic beam;
   beam direction alteration means for shaping said electromagnetic beam and modifying the direction of said electromagnetic beam at various locations within said device;
   rotating mirror means receiving said beam from said beam direction alteration means for causing said electromagnetic beam to be directed through a complete circle as the rotating mirror means rotates;
   a plurality of fixed mirrors arrayed circumferentially about the rotating mirror means, each of said fixed mirrors being inclined so as to direct said electromagnetic beam within a cone perpendicular to the rotation plane of the rotating mirror means;
   rotating prism means situated circumferentially intermediate the rotating mirror means and the fixed mirrors such that said electromagnetic beam passes through the rotating prism means and is refracted thereby, the rotating prism means including a plurality of circumferentially arrayed prism elements, each of said prism elements having a different refraction effect upon said electromagnetic beam; and
   motor means for causing the rotating mirror means and the rotating prism means to continually rotate in the same direction but at different speeds.

2. The device of claim 1 wherein the number of fixed mirrors is odd.

3. The device of claim 1 wherein
each of said prism elements has an equivalent circumferential width.

4. The device of claim 1 wherein
the circumferential width of each of the fixed mirrors is identical.

5. The device of claim 1 wherein
each of said prism elements is adapted to refractively deflect said electromagnetic beam from said rotation plane.

6. The device of claim 1 wherein
the optical beam creation means is a helium-neon laser.

7. The device of claim 1 wherein
the beam direction alteration means includes stationary reflectors disposed within a housing enclosing the device.

8. The device of claim 1 wherein
the rotating mirror means is a cylindrical diagonally cut member silvered to reflect said electromagnetic beam.

9. The device of claim 1 wherein
the number of fixed mirrors is nine and each of the fixed mirrors intersects each adjacent fixed mirror at an angle of 40°.

10. The device of claim 1 wherein
the reflective surface of each fixed mirror has an angle of inclination with respect to said rotation plan of between 135° and 140°.

11. The device of claim 1 wherein
the number of said prism elements is eight.

12. The device of claim 11 wherein
said prism elements refract said electromagnetic beam from said rotation plane by amounts in equal steps from approximately $+21°$ to approximately $-21°$.

13. The device of claim 1 wherein
the motor means includes a first motor for rotating the rotating mirror means and a second motor for rotating the rotating prism means.

14. The device of claim 13 wherein
said second motor is a constant speed DC motor with a bell rotor to which the rotating prism means is affixed; and
said first motor is a constant speed DC motor driving a shaft affixed to the rotating mirror means.

15. The device of claim 14 wherein
said shaft passes through an axial passage in said second motor.

16. The device of claim 1 wherein
the number of prism elements is eight.

17. The device of claim 1 wherein
the precise ratio of rotational velocities of the rotating prism means to the rotating mirror means is the number of prism elements to one less than the number of prism elements.

18. A scanning pattern generation device comprising;
rotating radial beam generation means for generating a beam directed radially from an origin point and continually rotating within a rotation plane;
rotating refraction means situated circumferentially about said origin point to refract said beam by a plurality of discrete angles from said rotation plane, the rate of rotation of the rotating refraction means differing from the rate of rotation of the rotating radial beam generation means; and
fixed reflection means situated coaxially with and exteriorly to the rotating refraction means to reflect said beam to a scan zone situated within a cone perpendicular to said rotation plane.

19. The device of claim 18 wherein
the rotating radial beam generation means includes a beam generator, a rotating reflector, beam direction means for directing said beam from said beam generator to said rotating reflector and first motor means for rotating said rotating reflector.

20. The device of claim 18 wherein
the rotating refraction means includes a plurality of discrete refraction elements disposed circumferentially in a ring and second motor means for rotating said ring.

21. The device of claim 18 wherein
the fixed reflection means includes a plurality of circumferentially arranged reflectors having their reflective surfaces inclined at an obtuse angle to said rotation plane.

22. The device of claim 19 wherein
the rotating refraction means includes a plurality of discrete refraction elements disposed circumferentially in a ring and second motor means for rotating said ring; and the fixed reflection means includes a plurality of circumferentially arranged reflectors having their reflective surfaces inclined at an obtuse angle to said rotation plane.

23. The device of claim 22 wherein
the number of refraction elements is eight; and the number of reflectors is nine.

24. The device of claim 19 wherein
said beam generator is a laser;
the rotating refraction means is a ring member including a plurality of circumferentially arranged prism elements; and
the fixed reflection means includes an odd number of fixed reflectors, each having a reflective face inclined at an obtuse angle with respect to said rotation plane.

25. The device of claim 24 wherein
the number of said prism elements is eight and the number of fixed reflectors is nine.

26. A bar code scanner-reader device, comprising:
an enclosing housing including portions of one surface thereof being transparent to electromagnetic beams, said transparent portions including a scanning beam window portion and a reflected beam window portion;
a beam generator for generating a scanning beam, situated within the housing;
a scattering system for scattering said scanning beam through said scanning beam window, the scattering system including a rotating mirror for directing said beam radially outward within a circle in a plane, a rotating prism ring, rotating in the same direction as but at a different rate than said rotating mirror, said prism ring including a plurality of discrete prisms for refracting said beam from said plane, motive means for rotating said rotating mirror and said prism ring, and a plurality of fixed mirrors for reflecting said refracted beam through said scanning beam window to a scan zone;
beam shaping and directing means for shaping said beam and directing it from the beam generator to said scattering system; and
beam collection means situated to collect portions of said beam reflected off exterior objects through said reflective beam windows, the beam collection means including beam focusing means and beam detector means for detecting said reflected beam and generating signals analogous thereto and delivering said signals to analyzing means.

27. In a scanning beam system including a beam generator, a scattering system and beam collection and detecting elements, the improvement comprising constructing the scattering system to include:
rotating reflector means for directing a radial beam sequentially through a circular path in a rotation plane;
rotating refraction means for rotating coaxially with but at a different rate from the rotating reflector means for intercepting said radial beam and refracting it from said rotation plane, the degree of refraction being dependent on the portion of the rotating refraction means which intersects said beam; and
stationary reflector means including a plurality of circumferentially arranged reflector elements, each positioned to reflect said beams directed toward a portion of said circular path to an external scan zone.

* * * * *

UNITED STATES PATENT AND TRADEMARK OFFICE
CERTIFICATE OF CORRECTION

PATENT NO. : 4,795,224

DATED : January 3, 1989

INVENTOR(S) : GOTO, KATSUCHIKA

It is certified that error appears in the above-identified patent and that said Letters Patent is hereby corrected as shown below:

Title page, item [75] Inventor: "Katsuchlika" should read --Katsuchika--.

Column 1, line 29, delete "to"
Column 2, line 36, "that" should read --than--.
Column 5, line 59, "According, it is has been" should read --Accordingly, it has been--.
Column 5, line 67, insert --it-- after "refocuses"
Column 6, line 10, insert --it--after "so that"
Column 6, line 47, "desireable" should read --desirable--.
Column 10, line 49, insert --in-- after "illustrated"
Column 12, line 63, "pass 62" should read --path 62--.

Signed and Sealed this

Eighth Day of August, 1989

Attest:

DONALD J. QUIGG

Attesting Officer

Commissioner of Patents and Trademarks